(12) United States Patent
Cahen

(10) Patent No.: US 10,856,690 B2
(45) Date of Patent: Dec. 8, 2020

(54) BEVERAGE MACHINE WITH AN ERGONOMIC SERVICE UNIT

(71) Applicant: NESTEC S.A., Vevey (CH)

(72) Inventor: Antoine Cahen, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 156 days.

(21) Appl. No.: 16/080,725

(22) PCT Filed: Mar. 1, 2017

(86) PCT No.: PCT/EP2017/054678
§ 371 (c)(1),
(2) Date: Aug. 29, 2018

(87) PCT Pub. No.: WO2017/148965
PCT Pub. Date: Sep. 8, 2017

(65) Prior Publication Data
US 2019/0059631 A1 Feb. 28, 2019

(30) Foreign Application Priority Data
Mar. 2, 2016 (EP) .................................... 16158200

(51) Int. Cl.
*A47J 31/36* (2006.01)
*A47J 31/44* (2006.01)
*A47J 31/40* (2006.01)

(52) U.S. Cl.
CPC ....... *A47J 31/3638* (2013.01); *A47J 31/3633* (2013.01); *A47J 31/407* (2013.01); *A47J 31/44* (2013.01)

(58) Field of Classification Search
CPC .. A47J 31/3638; A47J 31/3633; A47J 31/407; A47J 31/44; A47J 31/22; A47J 31/462; A47J 31/46; A47J 31/40; A47J 31/446; A47J 31/06; A47J 31/057
USPC ......... 99/275, 279, 280, 281, 285, 287, 288, 99/290, 219, 295, 300, 385, 453
See application file for complete search history.

(56) References Cited

U.S. PATENT DOCUMENTS

| | | | |
|---|---|---|---|
| 2010/0251900 A1* | 10/2010 | Cahen ................. | A47J 31/3619 99/295 |
| 2010/0300301 A1* | 12/2010 | Cahen ................. | A47J 31/4403 99/323.1 |
| 2011/0308396 A1* | 12/2011 | Mori ..................... | A47J 31/468 99/275 |

FOREIGN PATENT DOCUMENTS

WO 2009074559 6/2009
WO WO-2014082940 A1 * 6/2014 .......... A47J 31/3685

* cited by examiner

*Primary Examiner* — Serkan Akar
*Assistant Examiner* — Chris Q Liu
(74) *Attorney, Agent, or Firm* — K&L Gates LLP

(57) ABSTRACT

A beverage preparation machine (1) has: an extraction unit with a closed configuration for extracting a capsule (2) therein and an open configuration for removing the used capsule (2) therefrom; and a service unit (10) located under the extraction unit (20) and forming a receptacle having a collection cavity (11) for collecting the used capsule (2) and residual liquid projections (3) from the extraction unit (20). The service unit (10) has an upright wall (130) delimiting at least one through-passage (131) for favouring air circulation from inside the cavity (11) to outside the machine (1). The through-passage (131) is angled away from the direction of the liquid projections from the extraction unit (20) so as to inhibit the passage of the liquid projections through the through-passages.

16 Claims, 2 Drawing Sheets

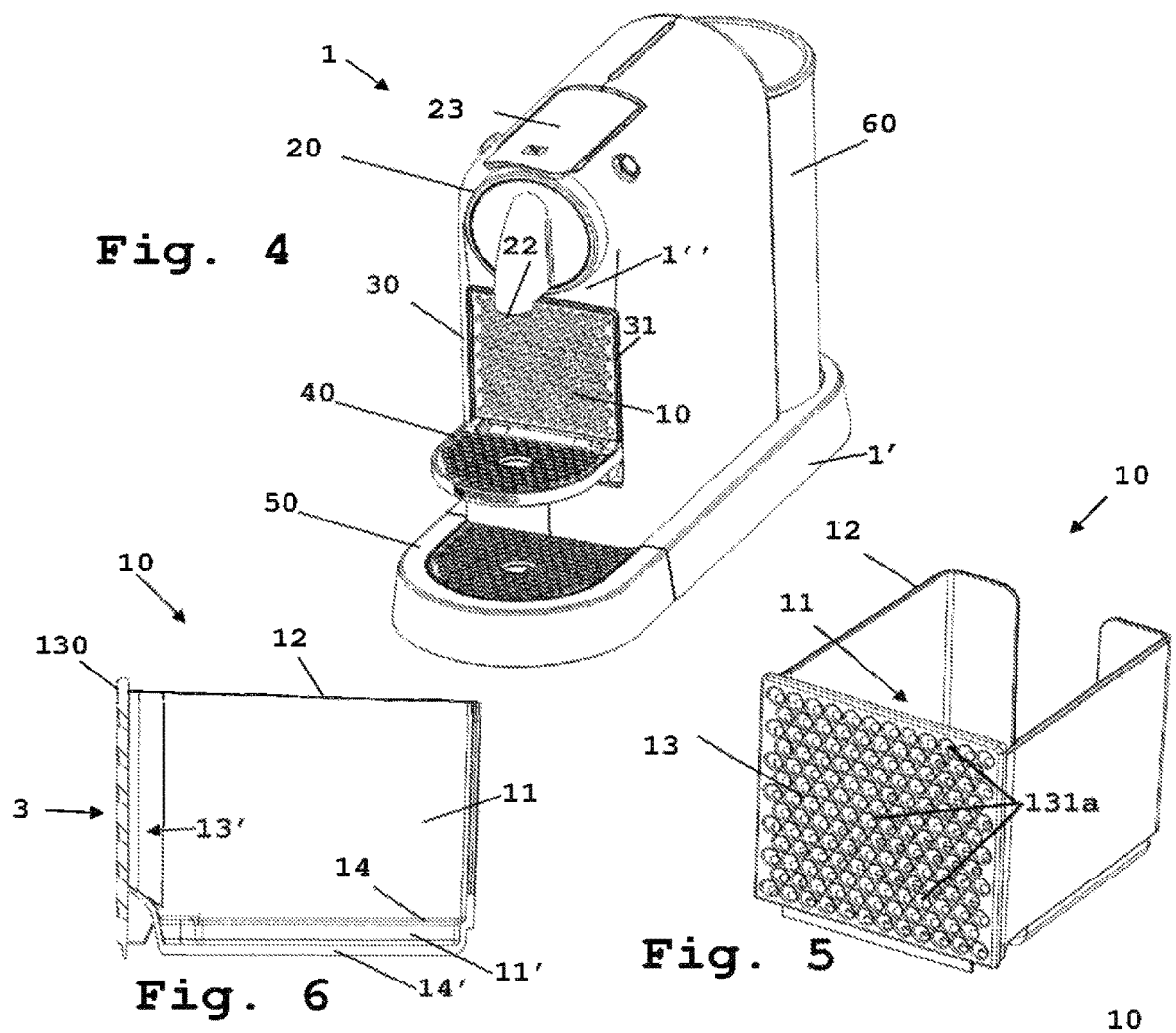
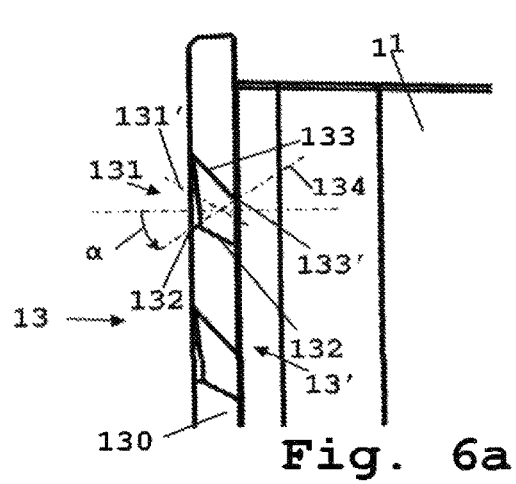
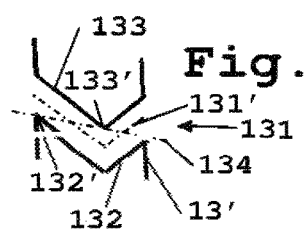
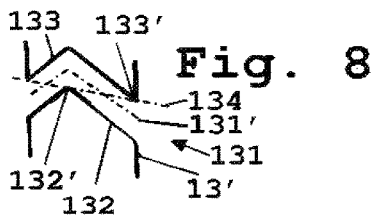

BEVERAGE MACHINE WITH AN ERGONOMIC SERVICE UNIT

CROSS REFERENCE TO RELATED APPLICATIONS

The present application is a National Stage of International Application No. PCT/EP2017/054678, filed on Mar. 1, 2017, which claims priority to European Application No. 16158200.2, filed on Mar. 2, 2016, the entire contents of which are being incorporated herein by reference.

FIELD OF THE INVENTION

The field of the invention pertains to beverage preparation machines with a service unit for collecting used ingredient capsules.

For the purpose of the present description, a "beverage" is meant to include any liquid food, such as tea, coffee, hot or cold chocolate, milk, soup, baby food, etc. . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Beverage preparation machines are becoming very popular whether at home or in offices. For instance, there are machines for the preparation of beverages such as coffee, tea, soup or other similar beverages, in which at least one ingredient of the desired beverage, for example ground coffee, is supplied within a capsule into a capsule extraction chamber of the machine.

The ingredient is typically extracted by a liquid, such as water, circulated in the beverage preparation machine from a source of liquid through the capsule extraction chamber. From the extraction chamber, the liquid containing the extracted ingredient is dispensed via a beverage outlet of the machine to a user, e.g. into a user-cup or user-mug appropriately placed underneath the outlet during the beverage preparation process.

The use of capsules, such as plastic and/or aluminium-based capsules, for the preparation of beverages has many advantages. Capsules, in particular aluminium-based capsules, are hermetic or gas tight and thus can protect the beverage ingredient effectively during an extended period of time against the environment such as air, humidity or light, before use of the ingredient.

Capsules are usually inserted individually into the machine's extraction chamber, manually or automatically from a capsule stack. Hot or cold water is then passed through the capsule for brewing or otherwise extracting the ingredient(s) contained within the capsule and form the desired beverage. The prepared beverage is supplied via an outlet of the machine into a cup, mug or other receptacle to the user.

Upon extraction, the used capsules may be removed individually from the beverage preparation machine after each preparation cycle. Alternatively, the used capsules may be evacuated to a machine's used-capsule receptacle and collected therein.

The beverage preparation machines are advantageously provided with a service unit for handling waste materials generated during the beverage preparation process. The waste materials include waste ingredients, e.g. contained in capsules, and/or liquid such as liquid evacuated from the liquid circuit between the liquid source and the beverage outlet or excess beverage dispensed at the beverage outlet, e.g. in the form of drips at the end of a beverage preparation process. For example, the service unit includes a waste liquid collect arrangement with at least one of a: user-recipient support provided with a liquid evacuation arrangement such as a grid; and a waste ingredient holding arrangement. Typically, the user-recipient support and/or the waste ingredient holding arrangement are situated above the waste liquid collect arrangement so that waste liquid may be evacuated by gravity from the user-recipient support and/or the waste ingredient holding arrangement to the waste liquid collect arrangement.

Advantageously, the service unit with the used-capsule receptacle is located underneath the capsule chamber so that the capsules may fall by gravity into the receptacle upon extraction. In the latter case, the receptacle has to be emptied by the user when full. The receptacle may be a removable receptacle located in the beverage preparation machine typically under the extraction chamber. Usually, the beverage preparation machine has a seat for receiving such a service unit. Typically, the seat is located inside the machine's housing and is so configured that the service unit can be slid in an out of the beverage preparation machine.

Service units of beverage preparation machines are for example disclosed in EP 1 095 605, EP 1 731 065, EP 1 867 260, WO 2009/013778, WO 2009/074559, WO 2009/135869, WO 2011/086087 and WO 2011/086088.

Such service units are advantageously combined with an extraction unit arranged to evacuate automatically any used capsules at reopening, for example as disclosed in EP 1 095 605, EP 1 646 305, EP 1 757 212, EP 1 859 713, EP 1 859 714, EP 2 103 236, EP 2 119 385, WO 2009/043630 and WO 2009/130099.

Such service unit are typically provided with a wall that is accessible from the outside of the machine when the service unit is in its operative position. To inhibit unnecessary accumulation of moisture in the service unit and/or the machine's seat receiving the service unit, this outside wall has been provided with through-openings for air circulation, e.g. as illustrated in WO 2009/074559 (e.g. FIG. 6).

Whereas such openings are useful to allow air circulation, they also allow the passage from inside the service unit to outside the machine of liquid projections resulting from ejecting capsules from the machine's extraction chamber.

It is also known to make the outside wall of the service unit as a solid (non-perforated) wall to prevent such liquid projections. However, such a configurations favours the accumulation of moisture in the service unit and in the seat.

SUMMARY OF THE INVENTION

It is thus a preferred objective of the present invention to address at least some of the above described drawbacks associated with service units.

The invention thus relates to a beverage preparation machine that includes an extraction unit having a capsule chamber and an outlet and an actuator. The chamber is configured for housing an ingredient capsule while extracted to form a beverage. The outlet is configured for dispensing the formed beverage, typically to a recipient placement area, e.g. a recipient support of the machine or an external surface. The actuator is configured to: open the capsule chamber for removing the capsule form the chamber after extraction and optionally inserting the capsule into the chamber before extraction; and close the capsule chamber for extracting the capsule in the chamber.

The machine further includes a service unit located under the extraction unit and forming a receptacle having a collection cavity with an opening for collecting via this opening the capsule and residual liquid projections from the chamber when opened to remove the capsule. The service unit has an upright wall defining an outside face that is accessible from outside the machine. The upright wall delimits at least one through-passage for favouring air circulation from inside the cavity to outside the machine, the through-passage extending from the cavity to the outside of the machine.

The machine also comprises a foot for being placed on an external horizontal placement surface so that such machine extends upwardly above the foot in an operative position for delivering the beverage via the outlet.

For instance, the machine is a coffee, tea, chocolate or soup preparation machine, such as a self-contained table-top machine that can be electrically connected to the mains, e.g. at home or in an office. In particular, the machine is arranged for preparing within the capsule chamber a beverage by passing hot or cold water or another liquid through the capsule containing an ingredient of the beverage to be prepared, such as ground coffee or tea or chocolate or cacao or milk powder.

For example, the preparation machine comprises: an ingredient processing arrangement including one or more of a liquid reservoir, a liquid circulation circuit, a heater or a cooler, a pump and the extraction unit arranged to receive ingredient capsules for extraction and evacuate capsules upon extraction; a housing having an opening leading into to the service unit to which capsules are evacuated from the preparation unit. Examples of such ingredient processing arrangements are disclosed in WO 2009/074550 and WO 2009/130099.

In accordance with the invention, when the machine is in its operative position on the external horizontal placement surface, the at least one through-passage has in vertical cross-section along the through-passage:
  a medial axis generally sloping upwards along the through-passage from the cavity to the outside of the machine; and/or
  a bottom delimitation line with a highest end and a top delimitation line with a lowest end, the highest end and the lowest end defining a straight axis sloping from the cavity to the outside of the machine:
    upwards by an angle relative to the external horizontal placement surface of less than 90 deg, such as less than 60 deg, e.g less than 45 deg; or
    downwards by an angle relative to the external horizontal placement surface of less than 50 deg, such as less than 45 deg e.g. less than 30 deg.

Thereby, residual liquid projecting from the chamber, when opened to remove the capsule, is inhibited from passing through the at least one through-passage to the outside of the machine via the upright wall.

Hence, projections of liquid through the upright wall of the service unit can be inhibited by an orientation of the wall's through-opening that is angled away from the direction of the projections so as to inhibit the passage of the projections through the through-passages.

For instance, the through-passage is made of: a straight passage; a curved or partly curved passage, e.g. a visually obstructed or unobstructed passage; or a broken passage, such as a v-shaped passage or inverted v-shaped passage, e.g. a visually obstructed or unobstructed passage.

The upright wall may have an internal face delimiting the cavity, at least one through-passage having an external opening on the outside face and an internal opening on the internal face.

At least one through-passage may generally form a circular or regular polygonal opening in cross-section parallel to the outside face.

At least one through-passage can generally form a slit extending substantially across the upright wall, such as generally horizontally across the upright wall or at an acute angle thereto.

The upright wall can delimit a plurality of passages, each such passage forming one of the abovementioned at least one through-passage.

The passages can be in a regular matrix or mesh arrangement over substantially the entire outside face.

The passages can be in a single linear arrangement over the outside face, such as over substantially the entire outside face.

The cavity can be user-visible through the upright wall for monitoring a level of fill of the cavity. For instance, the upright wall is made of transparent or translucent material or the through-passages of the wall revealing the cavity from outside the machine.

The cavity of the service unit can have a bottom delimiting a plurality of bottom through-passages for allowing a passage to a dampening or retaining chamber of liquid projections from the chamber when opened to remove the capsule and inhibit deflection on the bottom of the liquid to project to outside the machine via the upright wall. Optionally, the bottom has a grid or mesh structure. For instance, the bottom is provided with at least 5, e.g. at least 10 or 15 such bottom through-passages. The dampening or retaining chamber can be formed in a lower part of the service unit under the cavity and delimited by a lower bottom.

The machine may delimit a seat. The service unit can be housed in the seat and be removable therefrom for servicing, e.g. emptying the service unit. The seat may have an opening across which the upright wall extends when the service unit is housed in the seat. For instance, the outside face is generally flush with an outside housing of the machine.

To avoid clogging of the service unit, in particular with used capsules, the service unit may incorporate an anti-clogging system, for example as disclosed in WO 2009/074559 and in WO 2009/135869.

The extraction unit can have a first part delimiting the capsule chamber and a second part for closing and opening the capsule chamber. The first and second parts may be relatively movable by the actuator for closing and then opening the capsule chamber.

The actuator can include a motor and/or a handle.

The machine may have at least one cup support for supporting a recipient, e.g. a cup or a mug, under the outlet, the cup support comprising a stationary structure or a structure that is movable between an active deployed position for supporting a short recipient under the outlet or an inactive retracted position for placing a tall recipient under the outlet. For instance, the structure includes a placement surface for the recipient that is downwardly recessed, e.g. slightly curved, for centring a recipient under the outlet, e.g. when the placement surface is exposed to vibrations. Such vibrations may be caused by a vibrating, e.g. reciprocating, pump of the machine.

The machine may include a tank, typically for supplying water or another liquid to form a beverage, such as a tank located on a side of such machine that is opposite to the upright wall.

BRIEF DESCRIPTION OF THE DRAWINGS

The invention will now be described with reference to the schematic drawings, wherein:

FIG. 4 is an overall perspective view of an another embodiment of a beverage preparation machine having an extraction unit and a seat housing a service unit according to the invention;

FIG. 5 is a perspective view of the service unit of the machine of FIG. 4;

FIG. 6 is a cross-sectional side view of the service unit of FIG. 4;

FIG. 6a is an enlarged view of the upper left part of the service unit shown in FIG. 6 to illustrate the unit's through-passages;

FIG. 7 is a further embodiment of a through-passage of a service unit for a machine according to the invention;

FIG. 8 is yet another embodiment of a through-passage of a service unit for a machine according to the invention.

DETAILED DESCRIPTION

Figure 1:
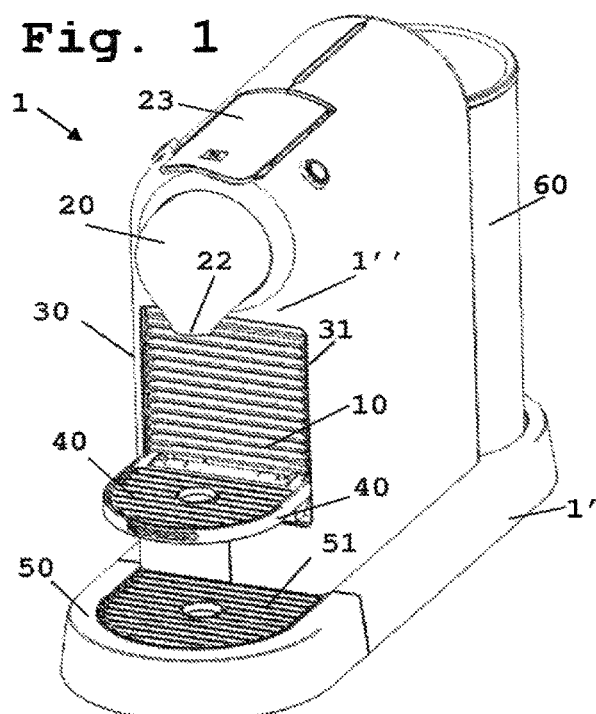
FIG. 1 is an overall perspective view of an embodiment of a beverage preparation machine having an extraction unit and a seat housing a service unit according to the invention.

FIGS. 1 and 4 illustrate examples of beverage preparation machines 1 according to the invention.

Figure 9:
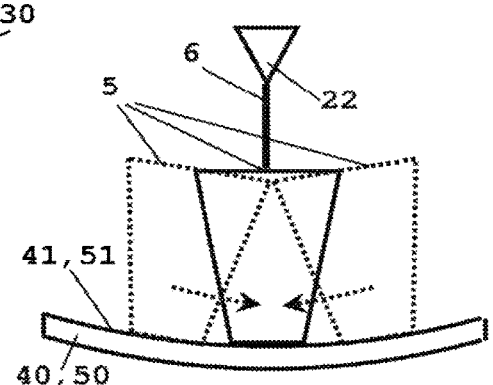
FIG. 9 schematically illustrates the filling of a recipient with a beverage from a machine according to the invention.

Machines 1 include an extraction unit 20 (FIGS. 1, 2 and 4) having a capsule chamber 21 and an outlet 22 and 30 an actuator 23. Chamber 21 is configured for housing an ingredient capsule 2 while extracted to form a beverage 6. Outlet 22 is configured for dispensing the formed beverage 6, typically over a recipient placement surface 41,51 (FIG. 9). Actuator 23 is configured to:

open capsule chamber 21 for removing capsule 2 form chamber 21 after extraction (FIG. 3) and optionally inserting capsule 2 into chamber 21 before extraction; and close capsule chamber 21 for extracting capsule 2 in chamber 21 (FIGS. 1 and 4).

Figure 2:
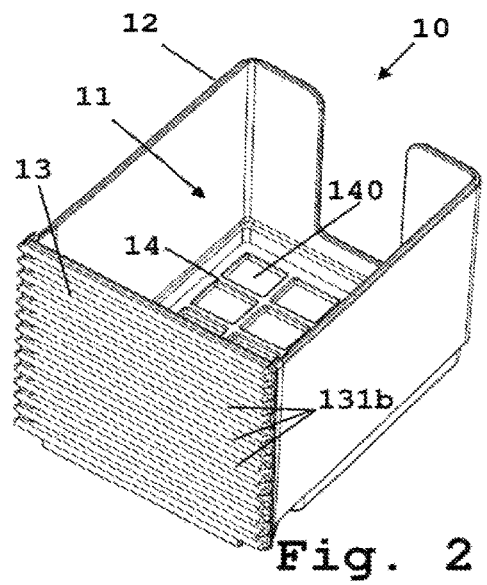
FIG. 2 is a perspective view of the service unit of the machine of FIG. 1.
Figure 3:
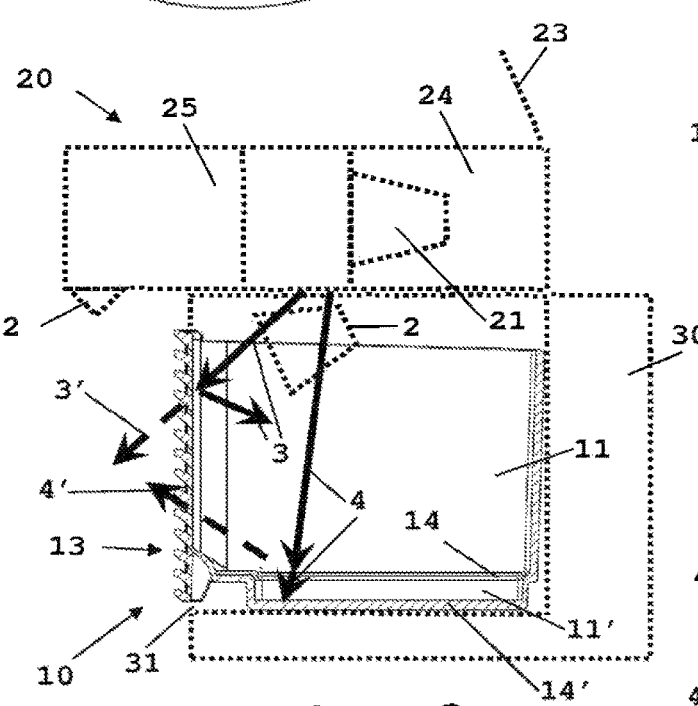
FIG. 3 is a cross-sectional side view of the service unit with a schematic illustration in dotted lines of the extraction unit and the seat of the machine of FIG. 1.

Each machine 1 includes a service unit 10 (FIGS. 1 to 8) located under extraction unit 20 (FIGS. 1, 3 and 4) and forming a receptacle having a collection cavity 11 with an opening 12 for collecting, via such opening 12, capsule 2 and residual liquid projections 3 from chamber 21 when opened to remove capsule 2 (FIG. 3). Service unit 10 has an upright wall 130 defining an outside face 13 that is accessible from outside machine 1. Upright wall 130 delimits at least one through-passage 131 for favouring air circulation from inside cavity 11 to outside machine 1. Through-passage 131 extends from cavity 11 to the outside of machine 1.

Moreover, each machine 1 has a foot 1' (FIGS. 1 and 4) for being placed on an external horizontal placement surface so that machine 1 extends upwardly above foot 1' in an operative position for delivering beverage 6 via outlet 22.

When any one of machines 1 (FIGS. 1 and 4) is in its operative position on the external horizontal placement surface, through-passage 131 has in vertical cross-section along through-passage 131 (FIGS. 3a, 6a, 7 and 8):

a medial axis 131' generally sloping upwards along through-passage 131 from cavity 11 to the outside of machine 1, the medial axis being for instance broken (FIGS. 3a, 7 and 8), non-broken (FIG. 6a) and/or at least partly curved; and/or a bottom delimitation line 132 with a highest end 132' and a top delimitation line 133 with a lowest end 133', highest end 132' and lowest end 133' defining a straight axis 134 sloping from cavity 11 to outside of machine 1:

upwards by an angle a relative to the external horizontal placement surface of less than 90 deg, such as less than 60 deg, e.g less than 45 deg; or downwards by an angle a relative to the external horizontal placement surface of less than 50 deg, such as less than 45 deg e.g. less than 30 deg.

Thereby, residual liquid projecting 3 from the chamber 21, when opened to remove capsule 2, is inhibited from passing 3' through passage 131 to the outside of any of machine 1 via upright wall 130 (FIG. 3).

Figure 3A:
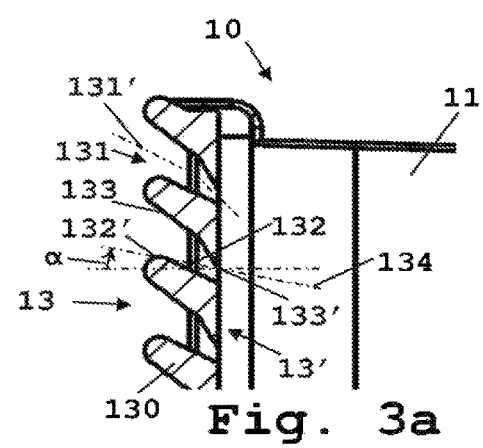
FIG. 3a is an enlarged view of the upper left part of the service unit shown in FIG. 3 to illustrate the unit's through-passages.

For instance, through-passage 131 is made of: a straight passage (FIG. 6a); a curved or partly curved passage, e.g. a visually obstructed or unobstructed passage; or a broken passage (FIGS. 3a, 7 and 8), such as a v-shaped passage (FIG. 7) or inverted v-shaped passage (FIGS. 3a and 8), e.g. a visually obstructed (FIGS. 7 and 8) or unobstructed passage (FIG. 3a).

Upright wall 130 can have an internal face 13' delimiting cavity 11. through-passage 131 may have an external opening on outside face 13 and an internal opening on internal face 13' (FIGS. 3a, 6a, 7 and 8).

Through-passage 131 may generally form a circular or regular polygonal opening 131a in cross-section parallel to outside face 13 (FIG. 5).

Through-passage 131 can generally form a slit 131b extending substantially across upright wall 130 (FIG. 2), such as generally horizontally across upright wall 130 or at an acute angle thereto.

Upright wall 130 may delimit a plurality of passages 131, each such passage 131 being a through-passage 131 of the above type (FIGS. 2 and 5).

Passages 131 can be in a regular matrix or mesh arrangement over substantially the entire outside face 13 (FIG. 5).

Passages 131 may be in a single linear arrangement over the outside face (e.g. forming a column of passages), such as over substantially the entire outside face 13 (FIG. 2).

Cavity 11 may be user-visible through upright wall 130 for monitoring a level of fill of cavity 11. For instance, upright wall 130 is made of transparent or translucent material (FIGS. 7 and 8) or through-passages 131 of wall 130 revealing cavity 11 from outside machine 1 (FIGS. 3a, 5 and 6a).

As illustrated in FIGS. 2 and 3 (and equally applicable to machine 1 of FIG. 4), cavity 11 of service unit 10 can have a bottom 14 delimiting a plurality of bottom through-passages 140 for allowing a passage to a dampening or retaining chamber 11' of liquid projections from chamber 21 when opened to remove capsule 2 and inhibit deflection on the bottom 14 of the liquid to project 4' to outside machine 1 via upright wall 130. Typically, bottom 14 has a grid or mesh structure. For instance, there are at least 5, e.g. at least 10 or 15 such bottom through-passages 140 provided in bottom 14. Dampening or retaining chamber 11' may be formed in a lower part of service unit 10 under cavity 11 and delimited by a lower bottom 14' (FIGS. 3 and 6).

Each machine 1 may delimit a seat 30 (FIGS. 1, 3 and 4). Service unit 10 can be housed in seat 30 and removable therefrom for servicing, e.g. emptying service unit 10. Seat 30 can have an opening 31 across which upright wall 130 extends when service unit 10 is housed in seat 30 (FIGS. 1, 3 and 4). For instance, outside face is generally flush with an outside housing 1" of machine 1 (FIGS. 1 and 4).

Extraction unit 20 can have a first part 24 delimiting capsule chamber 21 and a second part 25 for closing and opening capsule chamber 21 (FIG. 3). First and second parts 24,25 may be relatively movable by actuator 23 (FIGS. 1, 3 and 4) for closing and then opening capsule chamber 21.

Actuator 23 can include a motor and/or a handle 23.

Each machine 1 (FIGS. 1, 4 and 9) can have at least one cup support 40,50 for supporting a recipient 5, e.g. a cup or a mug, under outlet 22. Cup support 40,50 may be a stationary structure 50 or a structure 40 that is movable between an active deployed position for supporting a short recipient under the outlet 22 or an inactive retracted position for placing a tall recipient under the outlet 22 (FIGS. 1 and 4). For instance, structure 40,50 has a placement surface 41,51 for recipient 5 that is downwardly recessed, e.g. slightly curved, for centring a recipient 5 under outlet 22, e.g. when placement surface 41,51 is exposed to vibrations (FIG. 9). Such vibrations may be caused by a vibrating, e.g. reciprocating, pump of machine 1.

Each machine may comprise a tank 60, such as a tank located on a side of machine 1 that is opposite to upright wall 130.

The invention claimed is:

1. A beverage preparation machine comprising:
   an extraction unit having a capsule chamber and an outlet and an actuator, the capsule chamber configured for housing an ingredient capsule while extracted to form a beverage, the outlet configured for dispensing the formed beverage, and the actuator configured to:
      open the capsule chamber for removing the capsule from the capsule chamber after extraction;
      close the capsule chamber for extracting the capsule in the capsule chamber;
   a service unit located under the extraction unit and forming a receptacle having a collection cavity with an opening for collecting via the opening the capsule and residual liquid projections from the capsule chamber when opened to remove the capsule, the service unit having an upright wall defining an outside face that is accessible from outside the machine, the upright wall defining at least one though-passage for favoring air circulation from inside the collection cavity to outside the machine, the though-passage extending from the collection cavity to the outside of the machine; and
   a foot for being placed on an external horizontal placement surface so that the machine extends upwardly above the foot in an operative position for delivering the beverage via the outlet; and
   the machine in the operative position on the external horizontal placement surface establishes a position of the at least one through-passage having a vertical cross-section along the through-passage;
   wherein the vertical cross-section of the at least one through-passage along the at least one through-passage defines at least one feature selected from the group consisting of: (i) a middle axis sloping upwards along the at least one through-passage from the collection cavity to the outside of the machine and (ii) a bottom delimitation line with a highest end and a top delimitation line with a lowest end, the highest end and the lowest end defining a straight axis sloping from the collection cavity to the outside of the machine, the straight axis sloping upwards by an angle relative to the external horizontal placement surface of less than 90 degrees or downwards by an angle relative to the external horizontal placement surface of less than 50 degrees;
   whereby the residual liquid projecting from the capsule chamber, when opened to remove the capsule, is inhibited from projecting through the at least one through-passage to the outside of said machine via the upright wall.

2. The machine of claim 1, wherein the at least one through-passage is in a form selected from the group consisting of: a straight passage; a curved passage, a partly curved passage; and a broken passage.

3. The machine of claim 1, wherein the upright wall has an internal face defining the cavity, the at least one through-passage having an external opening on the outside face and an internal opening on the internal face.

4. The machine of claim 1, wherein the at least one through-passage forms a circular or regular polygonal opening in a cross-section parallel to the outside face.

5. The machine of claim 1, wherein the at least one through-passage forms a slit extending substantially across the upright wall.

6. The machine of claim 1, wherein the upright wall defining a plurality of passages.

7. The machine of claim 6, wherein the passages are in a regular matrix or mesh arrangement over substantially the entire outside face.

8. The machine of claim 6, wherein the passages are in a single linear arrangement over the outside face.

9. The machine of claim 1, wherein the cavity is user-viable through the upright wall for monitoring a level of fill of the cavity.

10. The machine of claim 1, wherein the cavity of the service unit has a bottom defining a plurality of bottom through-passages configured for allowing a passage to a dampening or retaining chamber of liquid projections from the chamber when opened to remove the capsule and inhibit deflection on the bottom of the liquid to project to outside the machine via the upright wall.

11. The machine of claim 1, comprising a seat and wherein the service unit is housed in the seat and removable therefrom for servicing.

12. The machine of claim 1, wherein the extraction unit has a first part defining the capsule chamber and a second part for closing and opening the capsule chamber, the first and second parts being relatively movable by the actuator for closing and then opening the capsule chamber.

13. The machine of claim 1, wherein the actuator comprises a motor and/or a handle.

14. The machine of claim 1, which has at least one cup support for supporting a recipient, the cup support comprising a stationary structure or a structure that is movable between an active deployed position for supporting a short recipient under the outlet or an inactive retracted position for placing a tall recipient under the outlet.

15. The machine of claim 1 comprising a tank.

16. The machine of claim 1 wherein the vertical cross-section of the at least one through-passage, in the position of the at least one through-passage that is established by the machine in the operative position on the external horizontal placement surface, defines both (i) a middle axis sloping upwards along the at least one through-passage from the collection cavity to the outside of the machine and (ii) a bottom delimitation line with a highest end and a top delimitation line with a lowest end, the highest end and the lowest end defining a straight axis sloping from the collection cavity to the outside of the machine, the straight axis sloping upwards by an angle relative to the external horizontal placement surface of less than 90 degrees; or downwards by an angle relative to the external horizontal placement surface of less than 50 degrees.

* * * * *